United States Patent [19]

Maine

[11] 4,398,352

[45] Aug. 16, 1983

[54] COMPENSATED MAGNETIC SENSOR FOR USE ON HIGHLY MAGNETIZED VEHICLES

[75] Inventor: Arthur E. Maine, Kirkland, Canada

[73] Assignee: Aviation Electric Ltd., Montreal, Canada

[21] Appl. No.: 282,974

[22] Filed: Jul. 13, 1981

[51] Int. Cl.³ .............................................. G01C 17/38
[52] U.S. Cl. ........................................ 33/356; 33/361
[58] Field of Search ................. 33/356, 357, 361, 362, 33/355 R

[56] References Cited

U.S. PATENT DOCUMENTS 2,852,859 9/1958 Depp ..................................... 33/356

FOREIGN PATENT DOCUMENTS 831637 1/1970 Canada ................................. 33/361

Primary Examiner—Harry N. Haroian
Attorney, Agent, or Firm—Anthony F. Cuoco; Vett Parsigian

[57] ABSTRACT

A magnetic sensor is disclosed which features an arrangement that relies upon the principle of a fixed, non-pendulous magnetic sensing device (2), which is rendered insensitive to the effect of the earth's vertical magnetic field component by means of an adjacent cooperating magnetic member (20) pendulously-supported to maintain its axis along the true vertical. Means (34, 44, 46, 48, 50) are disclosed whereby the magnetic field provided by the pendulously-supported magnetic member is automatically adjusted to cancel the earth's vertical field even when the latter changes for any reason.

11 Claims, 9 Drawing Figures

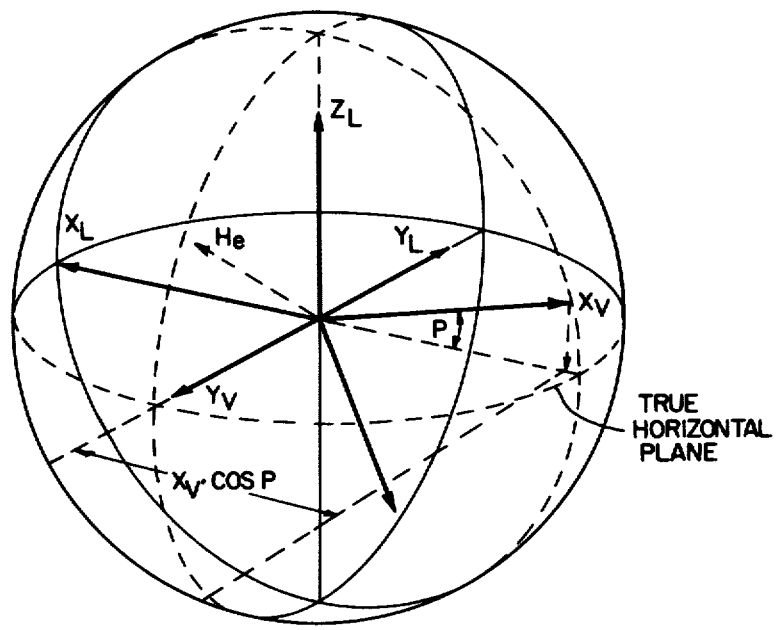
FIG. 3
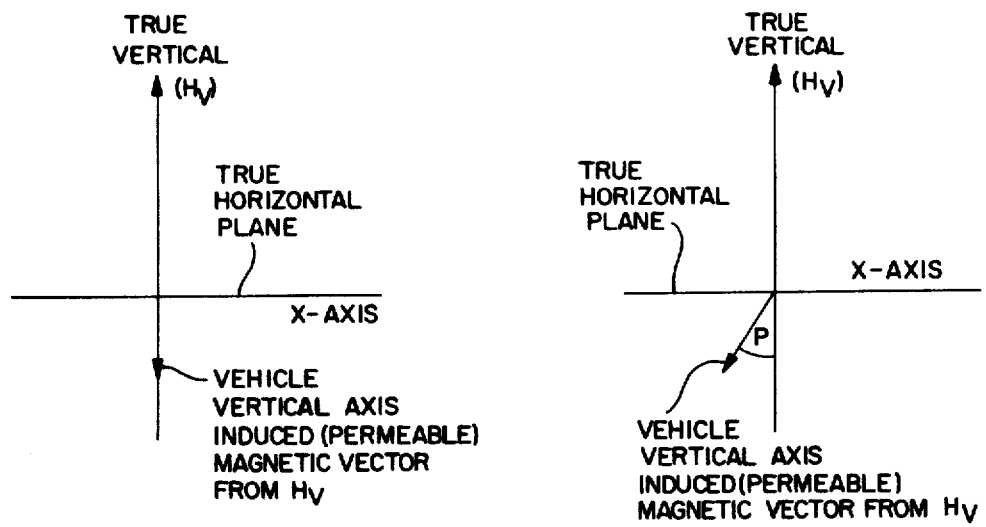
FIG. 4
FIG. 5

COMPENSATED MAGNETIC SENSOR FOR USE ON HIGHLY MAGNETIZED VEHICLES

BACKGROUND OF THE INVENTION

Magnetic Sensors are used in navigation systems for sensing the direction of the horizontal component of the earth's magnetic field to implement navigating a vehicle along a desired course. Although in principle, at least, an ordinary magnetic compass can be used for this purpose, magnetic sensors have the advantage of delivering the required information electrically, thus enabling its use in a great variety of ways.

A fluxgate sensor is a common type of magnetic sensor that is well known in the art. While the present invention will be described with reference to a fluxgate sensor, it is to be understood that any magnetic sensor capable of delivering a signal to find the heading of a carrier vehicle can be used with the invention.

The accuracy of magnetic sensors is impaired due to the self-magnetism of the carrier vehicles. In order to overcome this, the sensor is generally located on the most magnetically isolated part of the vehicle. In aircraft, for example, this is the wingtips or other structure far remote from the ferrous masses of the engines. In seacraft, the sensor is normally mounted high on a mast, away from the magnetic masses of the hull and engines.

Nevertheless, errors in the sensor's heading readings due to permanent and permeable magnetic effects in the carrier vehicle do occur, and these are usually compensated for by a variety of means well known in the art. Principally, local magnetic fields are generated that oppose those from the carrier vehicle through the use of magnets or coils through which currents are passed. Preferably, the compensating currents are passed into the windings of the sensor itself.

A major source of sensor error is the vertical component of the earth's field. In order to minimize this error, the sensors are pendulously-mounted, or gyro mounted, so that the sensor's sensitive or input axis is maintained in the true horizontal plane, whereby the sensor responds to the direction of the horizontal magnetic component of the earth's field and is perpendicular to the earth's vertical magnetic component, so that the latter will not induce errors even when the carrer vehicle experiences pitch and/or roll motion.

In the case of applications to air or seacraft, the pendulously-mounted sensor, together with its error-compensation means, has been effective and accurate, but this is due in large measure to the megnetically favorable locations available for mounting the sensor on these vehicles as aforenoted.

More recently, magnetic navigation systems employing magnetic sensors have been applied to land vehicles such as steel trucks, military battle-tanks, and the like. In these applications, it has been found that the vehicle's magnetic disturbances are much more severe, primarily because operational considerations demand that the sensor be mounted close to, or actually upon, the vehicle's surface. Analyses and measurements made for such vehicles indicate that compensation techniques currently available are relatively ineffective especially when the vehicle pitches and/or rolls, or such compensation techniques are required to be extremely complex and costly. Hence, the accuracy of an electrical compass system on such vehicles with current state-of-the-art compensation techniques is often not acceptable.

The compensated magnetic sensor to be described herein is addressed particularly, but not exclusively, to applicatons in highly magnetized land vehicles such as the aforenoted steel trucks or military battle-tanks, and is more simple, less costly and more accurate, particularly when the vehicle pitches and/or rolls, or remains stationary on steep inclines, than like compensated magnetic sensors now known in the art.

SUMMARY OF THE INVENTION

This invention contemplates a compensated magnetic sensor principally for use on highly magnetized vehicles, wherein the sensor is not pendulously-mounted, but is, in fact, mechanically strapped-down to the vehicle structure. The strapped-down sensor is surrounded with a pendulously-mounted cylindrical coil which creates, by virtue of an electrical current, a magnetic field which opposes the earth's vertical field, and thereby eliminates its effect. With this arrangement, pitch and/or roll of the vehicle does not induce magnetic effects from the vehicle axes to the sensor axes, since with the sensor strapped-down, both axes coincide and errors induced by vehicle pitching and rolling are essentially eliminated.

At the same time, the pendulous "vertical" coil supported by a single pivot eliminates errors caused by the earth's vertical field as the vehicle pitches and rolls. Further, the arrangement s such that the pendulously-mounted coil moves in yaw as well as pitch and roll because of its geometric symmetry. This is contrasted to prior art arrangements wherein the sensor is pendulously-mounted and must not be allowed to move in yaw relative to the vehicle, thus making the pendulous suspension in pitch and roll more complex and costly. Hence, with the arrangement described, the magnetic sensor may be used on highly magnetic carrier vehicles with improved accuracy and reduced costs compared to compensated magnetic sensors now known in the art.

BRIEF DESCRIPTION OF THE DRAWINGS

FIGS. 1-5 are diagrammatic representations illustrating the loss of accuracy when pendulously-mounted magnetic sensors are used in magnetic environments.

DETAILED DESCRIPTION OF THE INVENTION

It is well understood in the art that since the horizontal (sensitive) axes of a pendulously-mounted fluxgate (magnetic) sensor are maintained coincident with those of the (local) earth and are thereby perpendicular to true vertical, the sensor operates in earth coordinates.

When a carrier vehicle is dead level, its axes system designated as X, Y and Z is coincident with that of the earth. Under these conditions, the sensor is compensated for the vehicle's disturbing magnetic effects.

Figure 1:
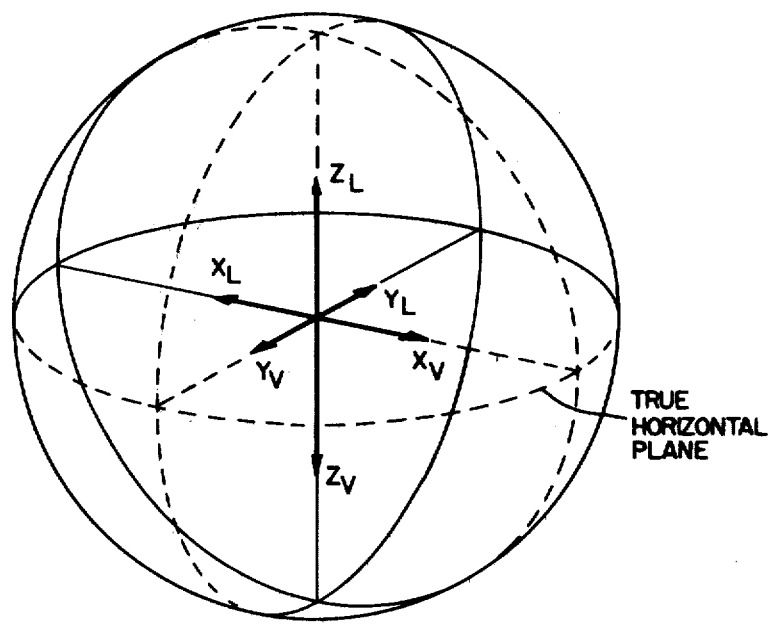

With reference to FIG. 1, and considering the state-of-the art, locally generated magnetic fields $X_L$ and $Y_L$, obtained by passing direct current into the sensor windings, are adjusted in amplitude and polarity to be equal and opposite to carrier vehicle magnetic fields $X_V$ and $Y_V$. Locally generated field magnetic field $Z_L$, obtained by passing current into a coil fixed to the vehicle and surrounding the sensor, is adjusted to be equal and opposite to vehicle vertical field $Z_V$. By these means a resultant vehicle-induced magnetic field intensity of zero is established at the sensor location. When this has been accomplished, and any permeable magnetic effects have been cancelled by other means, the sensor measures only the horizontal component of the earth's field, which is the required condition for obtaining maximum possible direction, or heading, accuracy.

Figure 2:
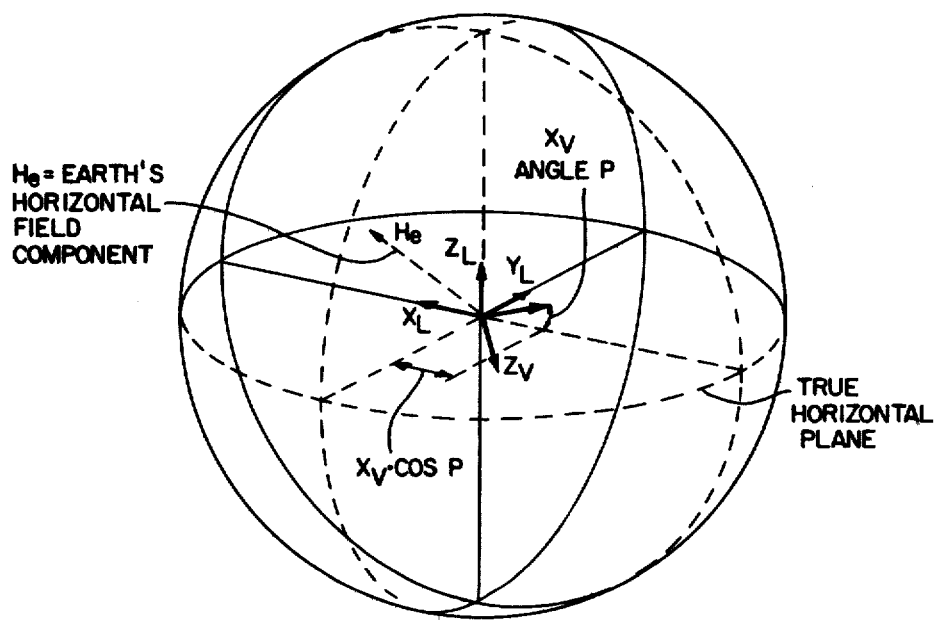

With reference to FIG. 2, the conditions that exist in a magnetic sensor located in a mild magnetic environment when the carrier vehicle is in pitch are illustrated. It is seen that the component of the vehicle X-axis magnetizaton ($X_V$) projected onto the true horizontal diminishes according to the cosine of the pitch angle, whereas the compensating field ($X_L$), acting in the true horizontal, remains fixed in value. Thus, the algebraic sum ($X_V$ Cos P)—$X_L$ is no longer zero. The difference adds vectorially to the earth's horizontal field component and a small heading error then occurs. The same analysis applies if the vehicle is in roll, except that the error would become effective along the vehicle Y-axis, being governed by ($Y_V$ Cos R)—$Y_L$.

FIG. 3 shows the same arrangement as that illustrated in FIG. 2, but when the magnetic sensor is in a strong magnetic environment, i.e., five times as strong as the earth's horizontal field, which is not an uncommon situaton. In this case, for the same angles of pitch (or roll) as previously indicated, the error term ($X_V$ Cos P)— $X_L$, or ($Y_V$ Cos R)— $Y_L$, as the case may be, becomes numerically much larger and can easily amount to a significant fraction of the magnitude of $H_e$, the earth's horizontal magnetic field component.

For the strong magnetic environment, the vector sum of $H_3$ and ($X_V$ Cos $P_X$) — $X_L$, or ($Y_V$ Cos $R_X$) — $Y_L$ can easily result in a large heading error, since the sensor can only respond to the total vector field in which it is immersed. That is to say, the sensor (fluxgate) looses its reference to magnetic north and in effect "points" away from magnetic north by some error angle.

It should be noted that permeable magnetic effects in mild magnetic environments are usually negligible in conventional sensor applications, but can assume significant proportions in highly magnetized environments such as encountered in land vehicles. However, in the case of horizontal permeable magnetic terms, there are simple signal processing techniques well known in the art for reducing their effects to negligible proportions. But a contributor of undesirable error is the permeable induced effect acting along the vehicle's vertical axis due to the vertical magnetic component of the earth's field.

FIG. 4 shows the induced vertical axis component with the vehicle level. Since this component is perpendicular to the sensor's horizontal axes, it has no effect. If the vehicle is pitched or rolled (or both) out of the true-horizontal, this permeable component introduces a sine P (or sine R) term into the sensor as illustrated in FIG. 5. P and R are the pitch and roll angles, respectively, with angle P shown in the Figure.

The effects described with reference to FIGS. 1-5 could, in principle, be cancelled out by adding pitch and roll inclinometer sensors to the compass system and processing their signals in a computer to eliminate the effects. However, this complicates the system, adds cost and is otherwise undesirable.

In summary, the usually serious inaccuracies encountered in pendulously-mounted magnetic (fluxgate) sensors when applied to highly magnetized vehicles are due to the transposition of vehicle magnetism into the sensor, when the axes systems of the sensor and vehicle move relative to one another.

The present invention substantially eliminates this relative axes movement even when the vehicle pitches and/or rolls. This is accomplished by eliminating the conventional pendulous sensor suspension and mounting the sensor, in effect, directly to the carrier vehicle structure, i.e., strapping the sensor down. However, even this approach, on its own, renders the sensor vulnerable to substantial errors due to the action of the earth's vertical field as the vehicle pitches and/or rolls.

The present invention overcomes this difficulty by surrounding the sensor with a pendulously-mounted cylindrical coil through which a current is passed of such a magnitude and sense that the earth's vertical field is reduced to zero within the measuring volume of the sensor.

Figure 6:
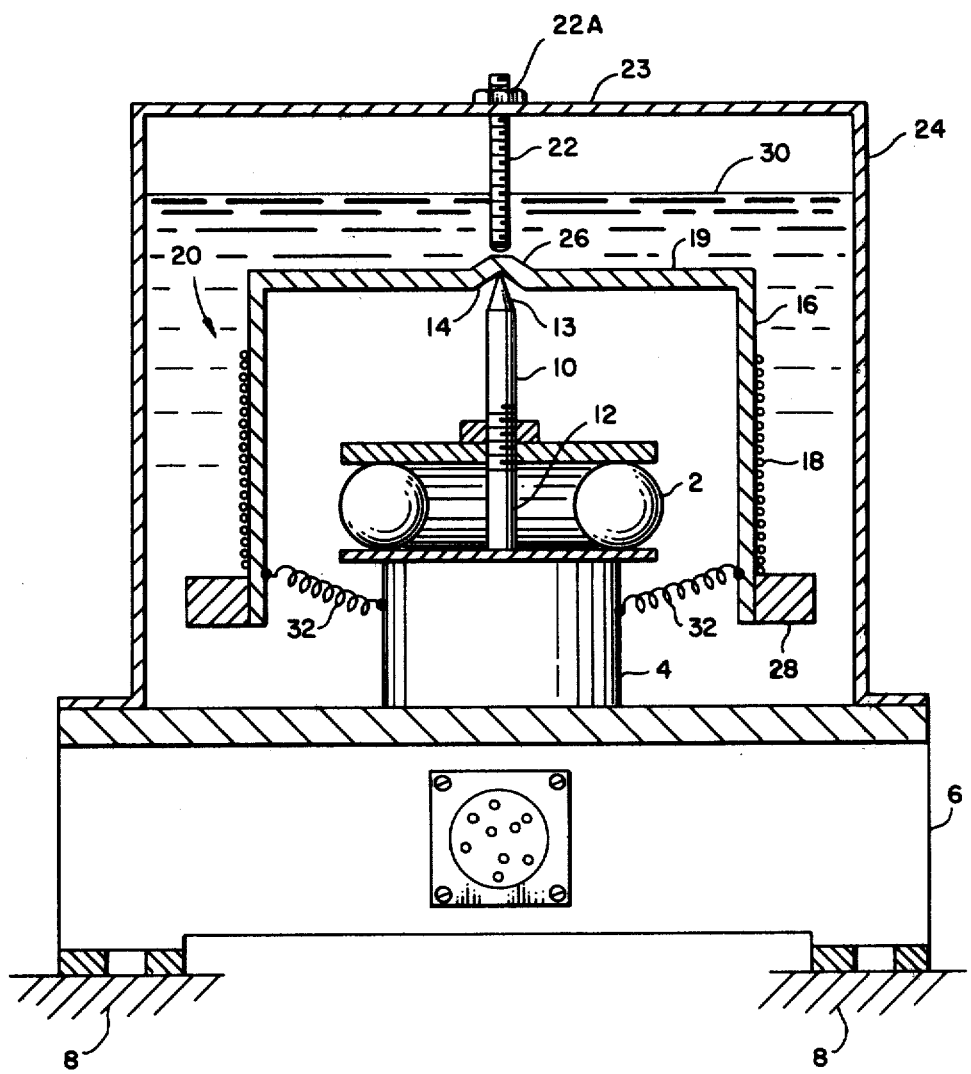
FIG. 6 is a partially sectioned diagrammatic representation illustrating one embodiment of the strapped-down compensated magnetic sensor of the invention.

Reference is now made to FIG. 6, which shows one embodiment of the present invention wherein a strapped-down magnetic sensor coacts with a pendulously-mounted permanent magnet or electromagnet.

A torrodial-shaped fluxgate (or other type magnetic sensor) 2 is mounted to a pedestal 4, which is, in turn, mounted to a baseplate 6. Baseplate 6 is secured to a normally horizontal surface 8 of a carrier vehicle (not otherwise shown).

A post 10 is mounted to pedestal 4 and passes through a centrally disposed hole 12 in sensor 2. Post 10 is drawn to a point 13 at its upper end where it engages a detent 14 on the inside of a closed end 19 of a hollow cylindrical core 16 carrying a winding 18 of insulated wire. Core 16 and winding 18 form a coil member designated generally by the numeral 20, which surrounds sensor 2 as shown in the Figure.

A screw 22 axially aligned with post 10 is in threaded engagement with a closed end 23 of a hollow cylindrical case 24 and is adjusted therein via a nut 22A to be just clear of a protrusion 26 on the outside of the closed end of core 16 and in axial alignment with detent 14, so that coil member 20 pivots on post 10 when the sensor is subjected to vertical shocks and/or accelerations. The opposite end of coil member 20 carries a heavy continuous ring 28 which, in cooperation with the aforenoted pivoting action occurring at end 13 of post 10, provides pendulous suspension of coil member 20.

In order to damp out violent motions of the pendulous coil member when, for example, a land vehicle is traversing rough terrain at high speed, case 24, which is secured and suitably sealed to base plate 6, is partially filled with a suitable fluid such as silicone oil and designated by the numeral 30.

The pivot arrangement as aforenoted permits motion of coil member 20 in pitch, roll and yaw. The latter (yaw) motion is permissible only over a limited range due to the need not to overstretch the low spring rate helical coil electrical connections 32, which enable current from an external source (not shown) to be applied to coil 18.

Figure 7:
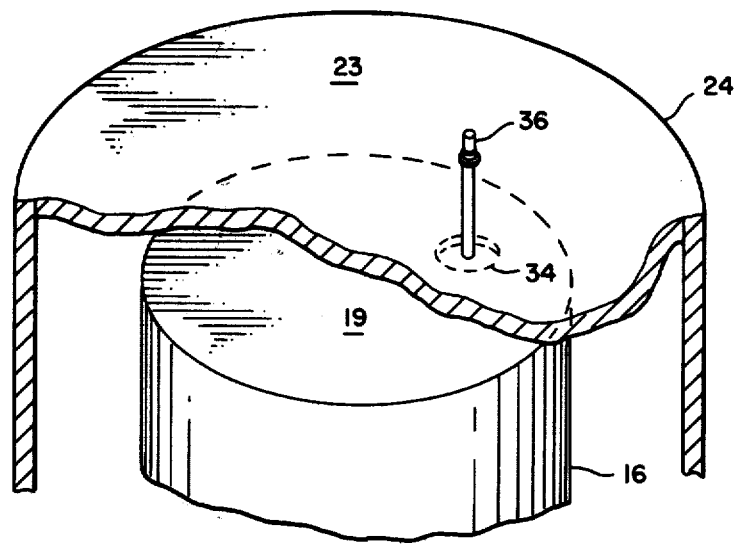
FIG. 7 is a partially sectioned diagrammatic representation illustration means for restricting yaw motion of the pendulously-mounted coil assembly shown in FIG. 6.

FIG. 7 illustrates a configuration for restricting yaw motion for the purposes aforenoted. Thus, a hole 34 is carried in the closed end 19 of core 16 and engages a pin 36 suitably mounted and sealed to closed end 23 of case 24, as will now be understood by those skilled in the art.

It is to be noted that sensor 2 includes a torroidal-shaped magnetic core carrying a plurality of windings, and its construction is necessarily imprecise from the point of view of mechanical symmetry. Because of this, in prior art pendulous fluxgate arrangements, mechanical balancing of the element is difficult, timeconsuming and costly, and must be executed precisely for accurate heading information to be obtained. Also, the windings entrap air or gas which is released from time to time thus changing flotation forces in fluid-filled units such as herein described, causing mis-levels to occur after completion of the balancing operation. Also, individual turns of multi-layer windings necessarily used in fluxgate sensor arrangements can shift position due to temperature changes and stress reliefs, which also cause loss of precise balance and consequential errors.

It will now be seen that in the present invention, the pendulous element (coil member 20) is inherently symmetrical about all radials and is not prone to the aforenoted problems associated with pendulous sensors. Hence, balancing is easy to carry out using adjustment screws (not shown) in ring 28, and the coil member remains stable after such balancing.

With the magnetic sensor described herein, the current required by the pendulously-supported coil member is set to its correct value manually by external means (not shown), which would form part of an overall electrical or electronic compass system. For purposes of discussion, one means for accomplishing this is to provide a rheostat (or potentiometer) for setting the current into the pendulous coil. With this arrangement, no calibration means is required. This vehicle would be driven on level ground, preferably in an easterly or westerly direction, and maintaining this course, the vehicle ascends or descendls, a hill, or man-made object that will cause the vehicle to pitch up or down. The consequent measured change of compass-system would then be restored to its original value by manually adjusting the rheostat, which, in turn, controls the current applied to the pendulous coil member. However, this manual adjustment would necessarily have to be repeated if the vehicle is moved such a large distance on the earth's surface that the intensity of the earth's magnetic field changes significantly.

Figure 8:
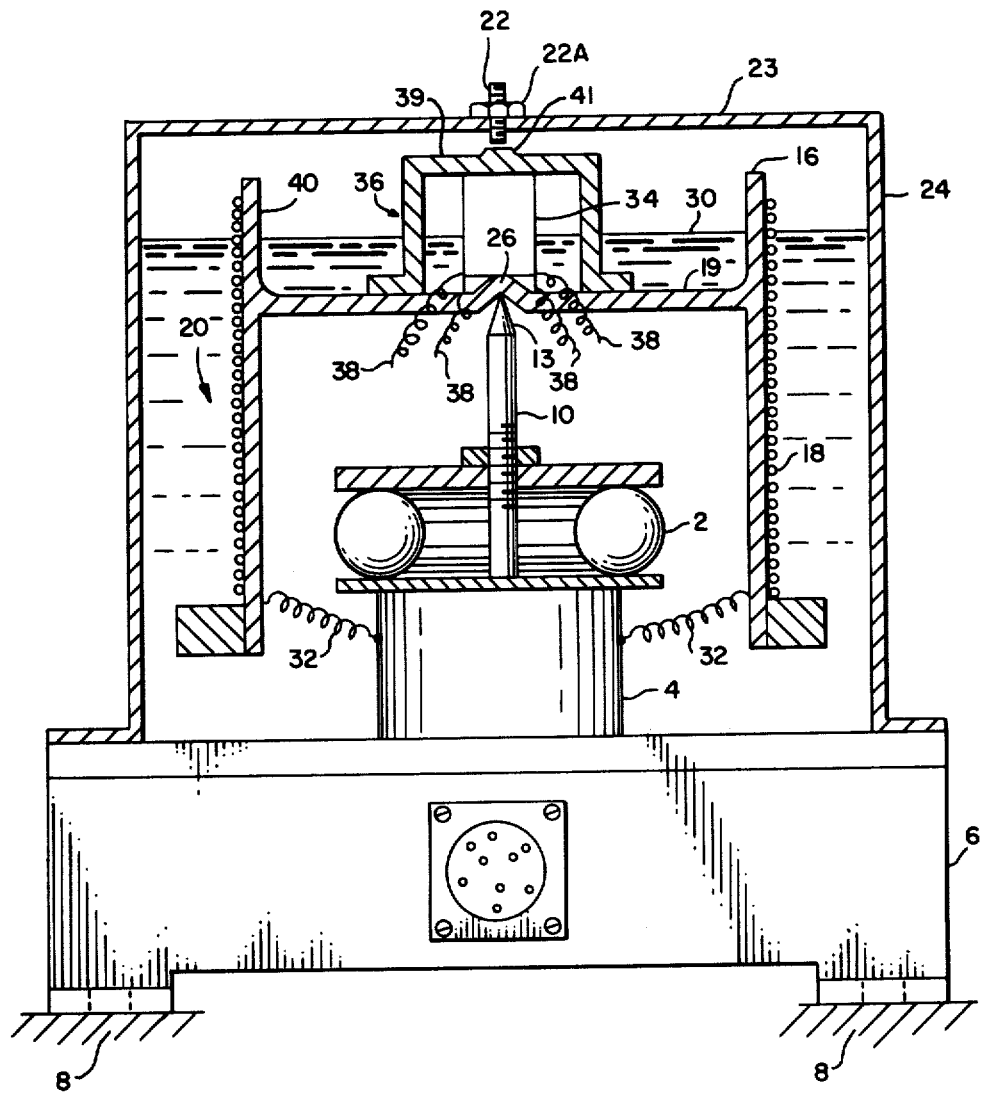
FIG. 8 is a diagrammatic representation illustrating another embodiment of the invention featuring a "vertical" or single-axis magnetic sensor.

In the embodiment of the invention illustrated in FIG. 8, which overcomes the possible limitation described above, a modification to the basic invention illustrated in FIG. 6 is illustrated. To this end the current in pendulously-supported coil member 20 is automatically adjusted to its correct value by external means associated with the compass system.

Thus, with reference to FIG. 8, a miniature single-axis magnetic (fluxgate) sensor 34 is mounted on protrusion 26 of core 16 in such a way that its input axis lies along the axis of coil member 20, and it may hence be described as a "vertical" sensor. A hollow cylindrical carrier member 36 is mounted on closed end 19 of coil member 20 to rigidly support single-axis sensor 34. Screw 22, which may now be a shorter screw, is adjusted via nut 22A to be just clear of a protrusion 41 on the outside of a closed end 39 of member 36. The cooperative relation between screw 22 and protrusion 41 prevents misalignment of carrier member 36 and hence sensor 34 under vertical shock and/or vertical acceleration conditions, which may be experienced by the carrier vehicle. Four electrical connecting conductors 38 lead from sensor 34.

An extended portion 40 of pendulously-supported coil member 20 renders sensor 34 responsive to the algebraic sum of the earth's vertical magnetic field, and that produced by the pendulously-mounted coil member itself.

Figure 9:
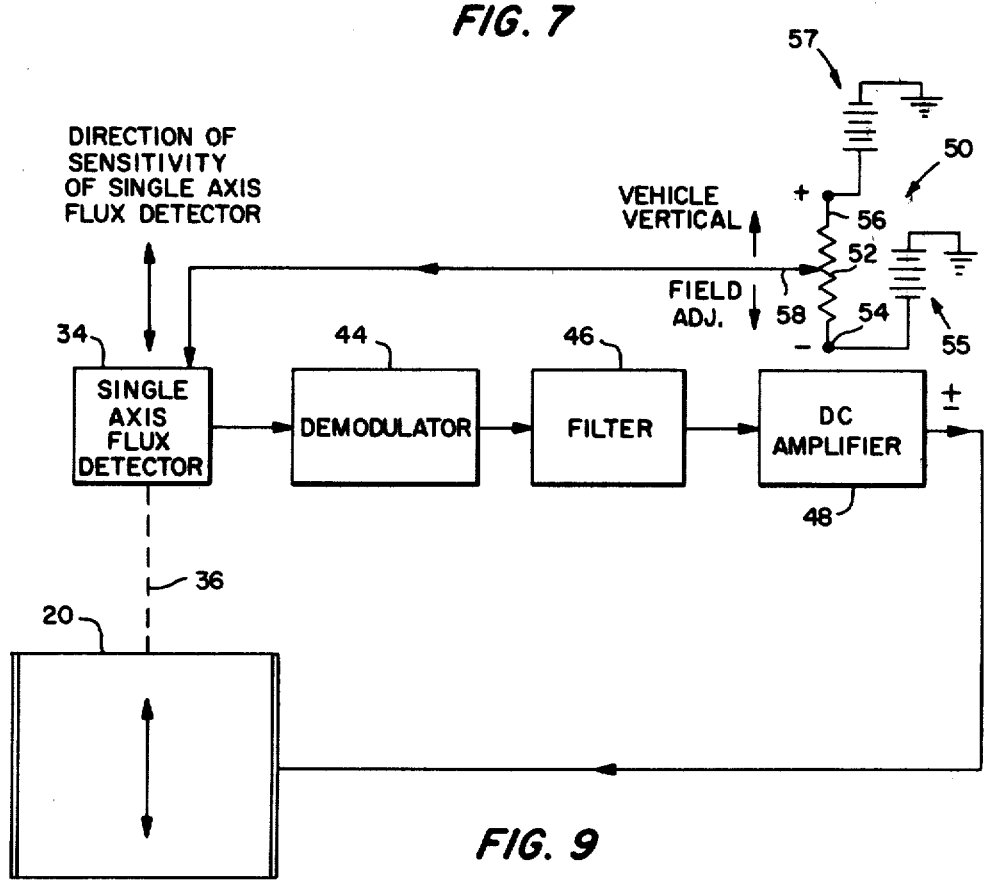
FIG. 9 is a block-diagram representation illustrating the single-axis magnetic sensor of FIG. 8 joined to external elements to form part of an overall compass system.

FIG. 9 shows an arrangement by which single-axis sensor 34 is joined to external elements which form part of the overall compass system and are used for the purpose of automatically adjusting the current supplied to pendulously-mounted coil member 20 to an appropriate value. This value is that current which results in single-axis sensor 34 measuring only the vertical magnetic field intensity of the vehicle, which occurs only when the field produced by the coil current exactly cancels out that produced by the earth in the vertical direction. However, because of the perpendicularity of the vehicle's vertical field to the main housing sensor, due to the strap down arrangement, this field, as previously described, has no afect on the determination of heading accuracy.

Thus, with continued reference to FIG. 9, single-axis sensor 34 is rigidly mounted to pendulously-supported coil member 20 via the rigid link provided by carrier member 36. Sensor 34 provides an AC pulse output which is applied to a demodulator circuit 44 and therefrom to a filter 46. The output from filter 46 is a DC output which is applied to a DC amplifier 48 as a control signal having a magnitude and sense commensurate with the magnetic flux intensity measured by sensor 34.

The output of amplifier 48 is applied to pendulously-supported coil member 20 in a sense as to cancel out the signal from single axis sensor 34 to zero due to the earth's vertical field, thereby insuring local cancellaton of the earth's vertical field by that produced by the coil member. With this negative-feedback type control loop, the signal applied by amplifier 48 to coil member 20 will automatically adjust to cancel the earth's vertical component, even when the latter changes for any reason.

In order to obtain the desired affect, it is important that the field from the pendulous coil does not interact with the vehicle's vertical field. This is accomplished by a bias control circuit 50, which is in effect a potentiometer and includes a resistor 52 having one leg 54 connected to a negative source of D.C. voltage shown as a battery 55, and another leg 56 connected to a positive source of D.C. voltage shown as a battery 57. An adjustable arm 58 is connected directly to the winding of single-axis sensor 34 and is manually adjusted as heretofore noted to provide the current required by coil member 20. Thus, bias circuit 50 provides a correction which takes into account the effect of the carrier vehicle's vertical field. The field produced by the output of the bias circuit cancels the vehicle's vertical field in single-axis sensor 34, with the illustrated closed loop cancelling out the earth's field only.

There is described herein an embodiment of the invention (FIG. 6) featuring a compensated magnetic sensor particularly, though not exclusively, for appliclations in highly magnetized environments such as encountered in land vehicles. The described arrangement is inherently more accurate than traditional pendulously-mounted sensors when such vehicles pitch or roll or remain stationary in a relative orientation on inclined surfaces. All directional or heading errors caused by relative rotation of the vehicle's permanent magnetic axes with respect to the sensor's axes are eliminated because with the disclosed structure no such relative axes rotations are possible.

Errors caused by rotation of the combined sensor and vehicle axes with respect to the vertical component of the earth's magnetic field are eliminated, by virtue of the action of a pendulously-mounted magnet that surrounds the fluxgate element, and whose strength is adjusted to be equal and opposite to that of the earth's vertical magnetic field within the volume of the fluxgate. Yaw movement of the pendulously-mounted magnet is permissible because of the circular magnetic symmetry of the latter. The pendulous action is obtained with a single pivot that permits, in addition, pitch and roll motions of the pendulous magnet. Conventional pendulously-supported magnetic sensors require a minimum of two gimbals and four pivots, which are much more costly and less reliable than the structure herein disclosed.

Because of the mechanical and magnetic circular symmetry of the pendulous element disclosed herein, mechanical yaw motion of the magnet is permissible as noted above. In conventional pendulously-supported fluxgate sensors, yaw motion of the suspended element relative to the vehicle axes system cannot be permitted since this would immediately cause heading errors. Thus, the gimbals and pivots of conventional pendulous sensors must be precise and hence costly to restrain the pendulous motions to pitch and roll only. In the present invention, these restraints are not required.

In regard to the embodiment of the invention shown in FIGS. 8 and 9, the correct counter magnet-motive-force required to cancel out the vertical component of the earth's magnetic field within the measuring volume of the fluxgate, thereby eliminating all heading errors of the device from this source, is carried out fully automatically after an initial adjustment of the potentiometer, eliminating the need for subsequent human interventon in this respect. In this connection, it is noted that since single-axis sensor 34 mounted on the pendulously-supported coil member always works in a "nulled" or essentially zero magnetic field strength, it can be made physically very small, thus having a negligible effect on the overall size of the sensor.

What is claimed is:

1. Apparatus for sensing the direction of the horizontal component of the earth's magnetic field to implement navigating a vehicle along a desired course, comprising:

a magnetic sensor strapped down to the vehicle structure so that the sensor axes and the vehicle axes coincide, whereby magnetism induced from the vehicle axes to the sensor axes when the vehicle pitches and rolls is essentially eliminated; and a symmetrical coil member surrounding the strapped down sensor and pendulously-supported relative thereto, and energized fan generating a magnetic field which opposes the earth's vertical field to essentially eliminate the effect of said field on the sensor when the vehicle is displaced about at least one of its pitch and roll axes.

2. Apparatus as described by claim 1, wherein:
   the symmetrical coil member surrounding the strapped down sensor is pendulously-supported so as to be displaceable about the pitch, roll and yaw axes of the vehicle.

3. Apparatus as described in claim 2, including:
   means for restricting displacement of the pendulously-supported symmetrical coil member about the yaw axis of the vehicle.

4. Apparatus as described by claim 1, including: a second magnetic sensor mounted on the pendulously-supported symmetrical coil member, with the axis of said second magnetic sensor being coincident with the axis of the pendulously-supported coil member; and
   the pendulously-supported coil member coacting with the second sensor so that said sensor is responsive to the algebraic sum of the earth's vertical magnetic field and the magnetic field generated by the pendulously-supported member.

5. Apparatus as described by claim 4, including:
   means associated with the second sensor and the pendulously-supported coil member for affecting the magnetic field generated by the member, whereby the second sensor senses a zero magnetic field which occurs only when the magnetic field generated by said coil member cancels out the earth's vertical field.

6. Apparatus as described by claim 5, wherein the means associated with the second sensor and the pendulously-supported coil member includes:
   means for rigidly mounting the second sensor to the pendulously-supported coil member, with the second sensor providing an AC pulse output corresponding to the magnetic field sensed thereby;
   means for demodulating the pulse output;
   means for filtering the demodulated output to provide a DC output;
   means for amplifying the DC output to provide a control output having a magnitude and sense commensurate with the magnetic field sensed by the second sensor; and
   the control output being applied to the pendullously-supported coil member in a sense as to reduce the output from the second sensor rigidly mounted to the pendulously-supported coil member, thereby effectively cancelling the earth's vertical magnetic field by the field generated by the pendulously-supported coil member.

7. Apparatus as described by claim 6, including:
   a control circuit connected to the second sensor for providing anf output which affects the magnetic field generated by said sensor for cancelling out the vehicle's vertical field.

8. Apparatus as described by claim 7, wherein the control circuit includes:
   a resistor;
   a positive voltage source connected to one leg of the resistor;
   a negative voltage source connected to the other leg of the resistor;
   a displaceable arm in cooperative relation with the resistor and displaced relative thereto to provide a correction signal commensurate with the vehicle's vertical field; and
   the second sensor connected to the displaceable arm and responsive to the correction signal provided thereby for cancelling out the vehicle's vertical field.

9. Apparatus for sensing the direction of the horizontal component of the earth's magnetic field to implement navigating a vehicle along a desired course, comprising:

a baseplate secured to a normally horizontal surface of the vehicle;

a pedestal mounted to the baseplate;

a torroidal magnetic sensor mounted to the pedestal and having a centrally disposed hole extending therethrough;

a post mounted to the pedestal and passing through the centrally disposed hole and drawn to a point on its end opposite the mounted end;

a hollow cylindrical core having a closed end and carrying a winding of insulated wire to provide a coil which surrounds the magnetic sensor, and carrying a detent on the inside of the closed end which pivotally engages the pointed end of the post;

a hollow cylindrical case having a closed end and mounted to the baseplate to surround the coil;

a screw axially aligned with the pose and in threaded engagement with the closed end of the case, and adjusted in the case to be just clear of a protrusion on the outside of the closed end of the core and axially aligned with the detent so that the coil is pendulously-supported between the pointed end of the post and the screw for displacement about pitch, roll and yaw axes of the vehicle;

the case being partially filled with a fluid to damp out extreme displacements about said axes; and the coil being energized to generate a magnetic field which opposes the earth's vertical field to essentially eliminate the effect of said field on the sensor when the vehicle pitches and rolls, with the magnetic effects induced from the vehicle axes to the sensor axes when the vehicle pitches and rolls being essentially eliminated by virtue of the sensor being mounted to the vehicle surface.

10. Apparatus as described by claim 9, including:

a hole in the closed end of the hollow cylindrical core;

a pin mounted in the closed end of the hollow cylindrical case; and the pin engaging the hole in cooperative arrangement for limiting displacement of the coil about the vehicle yaw axis.

11. Apparatus as described by claim 9, including:

a second magnetic sensor mounted on the protrusion on the outside closed end of the hollow cylindrical core so that its axis is coincident with the axis of the coil;

a hollow cylindrical carrier member surrounding the sensor, and having a closed end with a protrusion axially aligned with the protrusion on the outside of the closed end of the core;

the core having an open cylindrical portion extending above the closed end thereof and said insulated wire windings being carried on said portion so that the coil is extended to surround the first mentioned magnetic sensor and the second magnetic sensor;

the hollow cylindrical case surrounding the extended coil;

the screw axially aligned with the post and in threaded engagement with the closed end of the case being adjusted to be just clear of the protrusion on the closed end of the carrier member to maintain the alignment of the second sensor under conditions of vertical shock; and the extended portion of the coil rendering the second sensor responsive to the algebraic sum of the earth's vertical magnetic field and the field produced by the pendulously-supported coil.

* * * * *